US010310086B2

(12) United States Patent
Kalender et al.

(10) Patent No.: US 10,310,086 B2
(45) Date of Patent: Jun. 4, 2019

(54) METHOD AND DEVICE FOR LOCAL STABILIZATION OF A RADIATION SPOT ON A REMOTE TARGET OBJECT

(71) Applicant: MBDA Deutschland GmbH, Schrobenhausen (DE)

(72) Inventors: Carolyn Kalender, Sulzemoos (DE); Klaus Kefferpuetz, Scheyern (DE); Juergen Zoz, Friedberg (DE)

(73) Assignee: MBDA Deutschland GmbH, Schrobenhausen (DE)

(*) Notice: Subject to any disclaimer, the term of this patent is extended or adjusted under 35 U.S.C. 154(b) by 636 days.

(21) Appl. No.: 14/975,288

(22) Filed: Dec. 18, 2015

(65) Prior Publication Data
US 2016/0184924 A1    Jun. 30, 2016

(30) Foreign Application Priority Data

Dec. 19, 2014  (DE) .................. 10 2014 018 803
Aug. 8, 2015   (DE) .................. 10 2015 010 275

(51) Int. Cl.
*G01S 17/66* (2006.01)
*F41H 13/00* (2006.01)

(52) U.S. Cl.
CPC .......... *G01S 17/66* (2013.01); *F41H 13/0062* (2013.01)

(58) Field of Classification Search
CPC ..................... G01S 17/66; F41H 13/0062
See application file for complete search history.

(56) References Cited

U.S. PATENT DOCUMENTS 7,405,834 B1    7/2008  Marron et al.
8,076,624 B1   12/2011  Barchers
(Continued)

OTHER PUBLICATIONS

European Search Report issued in European counterpart application No. EP 15 00 3427 dated Apr. 18, 2016, with Statement of Relevancy (Four (4) pages).
(Continued)

*Primary Examiner* — Kevin K Pyo
*Assistant Examiner* — Don J Williams
(74) *Attorney, Agent, or Firm* — Crowell & Moring LLP

(57) ABSTRACT

A method for local stabilization of a radiation spot on a remote target object, where the radiation spot is formed by a high energy laser beam that is aimed at the target object by a high energy radiation emitter, the includes illuminating the target object is illuminated by an illumination beam that is aimed at the target object by an illumination device. The method also includes receiving, by an image acquisition device, radiation reflected by the target object that is illuminated by the illumination beam, where the radiation reflected by the target object to the image acquisition device passes through the same optical path as the high energy laser beam. An image processing is performed by analyzing and comparing an image of the illuminated target object or part of the illuminated target object acquired by the image acquisition device to at least one image of the illuminated target object or part of the illuminated target object produced at a prior point in time or to an image stored in an object database. And a correction signal is determined, based on the comparison, with which an optical correction device arranged in the optical path passed through by both the high energy laser beam and the reflected radiation is actuated.

15 Claims, 2 Drawing Sheets

(56) References Cited

U.S. PATENT DOCUMENTS

| | | | |
|---|---|---|---|
| 8,853,604 B1 | 10/2014 | Barchers | |
| 2001/0021804 A1* | 9/2001 | Nadeau | G01J 3/2803 |
| | | | 600/407 |
| 2003/0206350 A1 | 11/2003 | Byren et al. | |
| 2009/0097508 A1 | 4/2009 | Protz et al. | |
| 2009/0257679 A1* | 10/2009 | Hogasten | G06T 5/50 |
| | | | 382/275 |
| 2010/0097602 A1* | 4/2010 | LaFortune | G01J 1/4257 |
| | | | 356/152.1 |
| 2010/0282942 A1 | 11/2010 | Mosier et al. | |
| 2010/0283988 A1 | 11/2010 | Mosier et al. | |
| 2011/0103410 A1 | 5/2011 | Hutchin | |
| 2012/0292481 A1 | 11/2012 | Hutchin | |
| 2015/0029357 A1* | 1/2015 | Hamalainen | G02B 7/36 |
| | | | 348/223.1 |

OTHER PUBLICATIONS

Fitzpatrick et al.: "Bayesian statistical approaches to tracking through turbulence", American Control Conference, 2004. Proceedings of the 2004 Boston, MA, USA, Jun. 30-Jul. 2, 2004, Piscataway, NJ, USA, IEEE, Jun. 30, 2004 (Jun. 30, 2004), pp. 1499-1503, XP031989674, ISBN: 978-0-7803-8335-7.

Lucas et al., "An Iterative Image Registration Technique with an Application to Stereo Vision", *Proceedings DARPA Image Understanding Workshop*, pp. 674-679, 1981.

Singapore Search Report issued in Singapore counterpart application No. 10201510083Q dated Jul. 3, 2018 (Two (2) pages).

Singapore Written Opinion issued in Singapore counterpart application No. 10201510083Q dated Jul. 4, 2018 (Seven (7) pages).

German Office Action issued in German counterpart application No. 10 2015 010 275.3 dated Jan. 29, 2019 (Five (5) pages).

European Office Action issued in European counterpart application No. 15 003 427.0 — 1216 dated Feb. 7, 2019 (Five (5) pages).

Vela et al., "Knowledge-Based Segmentation for Tracking Through Deep Turbulence", IEEE Transactions on Control Systems Technology, vol. 16, No. 3, May 2008, pp. 469-474.

Higgs et al., "Atmospheric Compensation and Tracking Using Active Illumination", Proc. SPIE 3381, Airborne Laser Advanced Technology, 47, Sep. 8, 1998, 22 total pages.

\* cited by examiner

METHOD AND DEVICE FOR LOCAL STABILIZATION OF A RADIATION SPOT ON A REMOTE TARGET OBJECT

CROSS REFERENCE TO RELATED APPLICATIONS

This application claims priority under 35 U.S.C. § 119 from German Patent Application No. 10 2014 018 803.5, filed Dec. 19, 2014, and 10 2015 010 275.3, filed Aug. 8, 2015, the entire disclosures of which are herein expressly incorporated by reference.

TECHNICAL FIELD

The present invention relates to a method for local stabilization of a radiation spot on a remote target object. It furthermore relates to a device for local stabilization of a radiation spot on a remote target object in accordance with such a method. A high energy laser beam is emitted by a high energy radiation emitter and aimed at the target object that is remotely situated or moving at great distance and on which it produces the radiation spot. The goal is to destroy or damage the target object by means of the high energy laser beam.

BACKGROUND OF THE INVENTION

The propagation of high energy laser beams in the atmosphere is subject to turbulent disturbances that are caused by temperature fluctuations, and thus minor fluctuations in the refractive index of the air, and vary with time. These disturbances result in a local deflection of the high energy laser beam (the so-called tip/tilt portion) and an additional non-linear change in the beam profile. The effect of the high energy laser beam on the target deteriorates if the radiation spot does not constantly remain at the same location on the target object (even if the latter moves) but instead moves around on the target object. If the power of the high energy laser (HEL) is to be maximized on the target object, it is necessary to be familiar with and compensate for the turbulent disturbances. To this end, the target must initially be observed, for which purpose normally an image acquisition device is provided that detects light emitted or reflected by the target object.

In the case of extended targets, the following effects lead to an impairment in the target object image recorded by the image acquisition and thus to potential worsening of the stabilization of the radiation spot on the target object:

Non-homogeneous temporal variation in the surface brightness of the target object observed by the image acquisition device, e.g. moving glints, non-homogeneous illumination, shadows, effects of turbulence, etc.;

When the target is illuminated with an illuminating laser, additional speckle effects and non-homogeneities in the surface brightness may occur;

Heavy blurring of the target contours, e.g. by turbulences, non-homogeneous target illumination conditions, and speckle effects.

Moreover, the turbulence in the air that the high energy laser beam passes through on its way to the target is subject to local fluctuations; for the observability of the turbulence it is therefore necessary to detect these fluctuations within limited areas around the high energy laser beam. Typically the Fried parameter $r_0$ or the isoplanatic angle $\Theta_0$ is used for evaluating the locally suitable areas. They describe local or angular areas outside of which a significantly changed turbulence may be assumed.

Conventional ideas for detecting turbulence are known—for instance, using guidestars in astronomy or tip-tilt laser spots in connection with high energy lasers when detecting the tip-tilt portion. So-called adaptive optics are used for detecting higher modes of turbulence. These devices for detecting turbulence in accordance with these known methods each require additional sensors and/or transmitters.

In the field of image processing, widely used methods are measuring the center of gravity of the image of the target object in the image acquired by the image acquisition device or alternatively evaluating a four quadrant detector.

The drawback of this is that the temporal variations in the surface brightness are interpreted as a virtual turbulent tip-tilt movement and produce additional noise that has a significantly detrimental effect on the stabilization of the radiation spot on the target object. Image blurs also lead to additional noise.

Alternative methods, for instance correlation methods, are also sensitive to strong fluctuations in surface brightness. Contour tracking methods are less sensitive to target surface fluctuations in brightness, but produce significant additional noise in the image acquired by the image acquisition device with contour blurs of the target. Statistical methods published in the literature attempt to estimate turbulent image degradation, but do not solve the problem of temporal variation in surface brightness.

SUMMARY OF THE INVENTION

An object of the present invention is therefore to provide a method and a device for stabilization of a radiation spot on a remote target object so that rapid destruction of the target object by means of high energy laser beams is made possible.

This inventive method for local stabilization of a radiation spot on a remote target object, in which the radiation spot is formed by a high energy laser beam that is aimed at the target object by a high energy radiation emitter, and in which the target object is illuminated by an illumination beam that is aimed at the target object by an illumination device, is distinguished in that radiation reflected by the target object that is illuminated by the illumination beam is received by an image acquisition device, in that the radiation reflected by the target object to the image acquisition device passes through the same optical path as the high energy laser beam, in that the image of the illuminated target object or of a part of the target object produced by the image acquisition device is analyzed and compared to at least one image of the illuminated target object or of a part of the target object acquired at a prior point in time or to an image stored in an object database, and in that proceeding from this comparison a correction signal is determined with which an optical correction device arranged in the optical path passed through by both the high energy laser beam and the reflected radiation is actuated.

The image stored in an object database may also be a synthetic image or an image reduced to certain image elements (for instance, to edges). The comparison of the acquired image to an image stored in an object database may be advantageous in particular when there is no available image acquired at a past point in time or this previously acquired image is not suitable for a comparison. It may also make sense to compare a plurality of different images of different objects stored in the object database to the acquired image in order to initially identify the target object in this manner.

Since the light returning from the target object to the image acquisition device experiences the same turbulent atmosphere as the high energy laser beam (at least in the vicinity of the Fried parameter $r_0$), the image produced on the image acquisition device using the light returning from the target object to the high energy radiation emitter may be used as an indicator for the disturbances of the radiation spot on the target object produced by the high energy laser beam that are caused by the turbulence. Thus, in the vicinity of the high energy laser spot (that is, the radiation spot), the image of the target object on the image acquisition device experiences turbulent disturbances similar to those the radiation spot experiences. The inventive method consequently permits a turbulence estimate without having to perform a complicated technical wavefront measurement.

The turbulence estimate and the at least partial compensation of the turbulence effects on the high energy laser beam and the radiation spot formed thereby it on the target object that is performed thereafter are made on the basis of the images of the target object consecutively recorded by the image acquisition device, preferably high speed camera images. The differences that result from different wavelengths of the high energy laser beam and the returning light are not significant here.

The core idea of the invention is thus to use the temporal change of the image of the target object illuminated by the illumination beam, or of part of the target object that is situated as much as possible at the same location on the target object at which the high energy laser beam spot is situated, or at least in its immediate vicinity, on the image acquisition device as a measurement variable or indicator for the change in the actual high energy laser beam spot formed on target object.

Thus by using the inventive method there is an increase in the effective power at the site of the radiation spot on the target object using compensation of the effects of turbulence without there being a requirement for a major technical complexity.

It is particularly advantageous when the illumination beam has a wavelength that differs from the high energy laser beam.

It is advantageous when a prediction is made for a future image interference based on the comparison of the images of the illuminated target object, or of a part of the illuminated target object, that were acquired or produced at different points in time, and when the determination of the correction signal is made taking into account the predicted image interference.

The analysis of the acquired image preferably occurs by means of a least one image warping method, wherein a warped template image of the image is produced. This makes it possible to observe the image from another vantage point in the warped template image of the acquired image. A template image of the target object is used for analyzing the image by means of an image warping method. Comparing the acquired image to the warped template image permits conclusions to be drawn about the turbulence effects. For instance, translations, rotations, and scaling may be robustly determined proceeding from a template image using warping methods, such as for instance the Lukas-Kanade method [Lucas, B. D., Kanade, T.: An Iterative Image Registration Technique with an Application to Stereo Vision, Proceedings of Imaging understanding workshop, pp 121-130, 1981]. The type and number of permitted movements and transformations (warping parameters) may vary depending on the problem, so that projective phenomena may also be taken into account.

The quadratic pixel deviation between the acquired image and the warped template image is preferably minimized. This attains the goal of minimizing the summed quadratic pixel deviation between the warped template image and the recorded image. This matching across all pixels of the template image (and not just across individual features such as edges, for instance) provides for insensitive behavior to variation in the surface brightness (such as, e.g., interference from speckles) and blurring of the contours. The template image may be designed to be learning.

The prediction for a future image interference is preferably made based on the analysis of only one part of the acquired image.

In the context of another embodiment of the inventive method, it is also possible that not all pixel deviations are considered weighted equally in the target function, that is, the pixels are weighted differently.

The advantage of this is that, in a multi-stage method, initially a larger template image is used for detecting the entire target object in the image acquired by the image acquisition device and downstream a sub-template with an image excerpt is used for estimating the local turbulence.

The template images may be both stored in a database as model-based images and also extracted as adaptively learned from images from the high speed camera and continuously adapted during the course of the estimation process.

It is furthermore advantageous when the illumination beam emitted by the illumination device is a laser beam.

This inventive device for local stabilization of a radiation spot on a remote target object in accordance with the inventive method is distinguished by an illumination device for emitting an illumination beam onto a target object a high energy laser for emitting a high energy laser beam onto the target object, an optical correction device that is provided in the optical path of the high energy laser beam and that may be actuated by a control device, a radiation decoupling device that is provided in the optical path of the high energy laser beam and that is embodied for decoupling radiation that is from this optical path and that is received as a reflection of the illumination beam and to guide said radiation onto an image acquisition device, and an image processing device that is connected to the image acquisition device for transmitting an image signal therefrom and that is provided with a control device that is designed for producing a correction signal and that, for transmitting the correction signal, is connected to a control device for the optical correction device.

This device makes it possible, to estimate and compensate, in advance, the future turbulence effects on the high energy laser beam without major technical complexity such as would be necessary, for instance, when using a wavefront sensor.

It is advantageous when the image acquisition device is formed by a high speed camera or has the like. This permits a particularly precise analysis of the turbulence influences on the received radiation and thus a more precise prediction of the effects on the high energy laser beam.

In another advantageous refinement, the optical correction device is formed by a tip/tilt mirror or has the like. Alternatively, it is possible to actuate a deformable mirror for compensating higher modes.

Overall the advantage of maximizing the laser energy in the radiation spot formed on the target object is obtained, and thus a clear reduction in the radiation time, without using a wavefront sensor or guidestar, is also obtained.

Preferred exemplary embodiments of the invention with additional details and further advantages are described and explained in greater detail in the following, referencing the enclosed drawings.

DETAILED DESCRIPTION OF THE EXEMPLARY EMBODIMENTS

Figure 1:
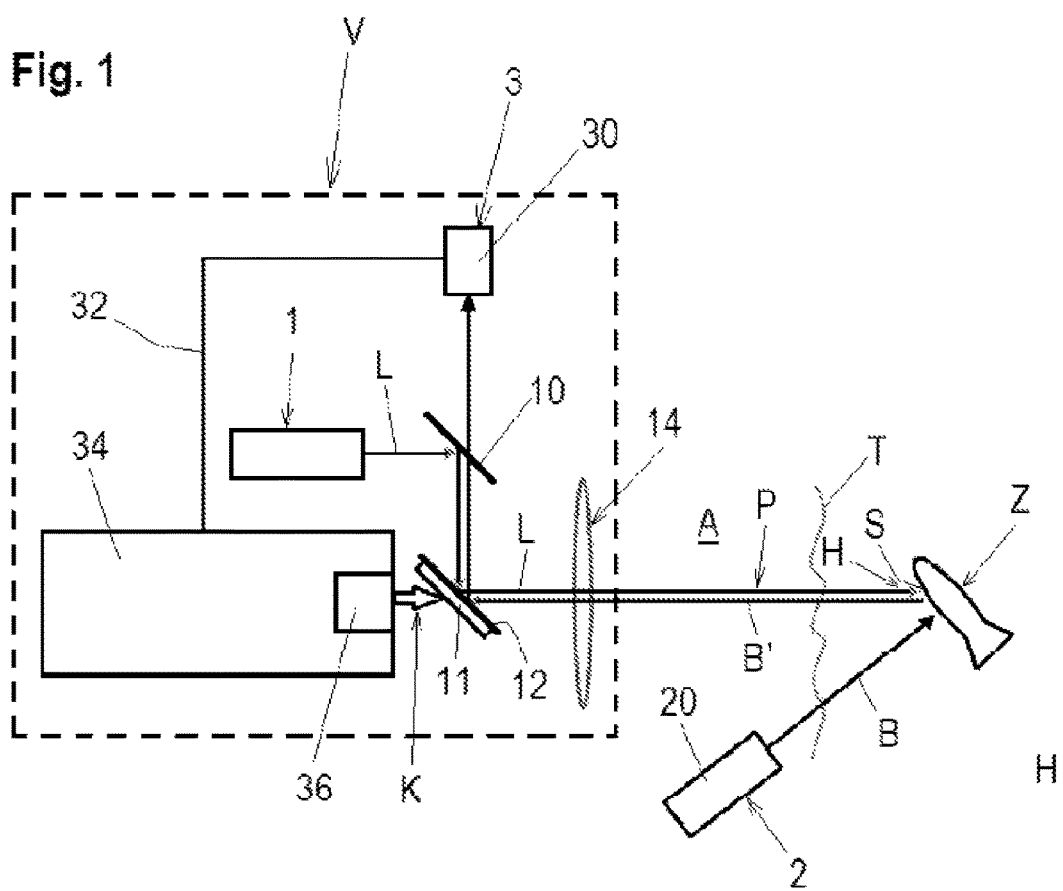
FIG. 1 is a schematic structure of an inventive device for local stabilization of a radiation spot on a remote target object.

FIG. 1 schematically depicts an inventive device for local stabilization of a radiation spot on a remote target object. This device has a high energy radiation emitter 1 that emits a high energy laser beam L. This high energy laser beam L strikes the first tilted mirror 10 and from there is relayed to a second tilted mirror 12. The first tilted mirror 10 is embodied as a dichroic mirror in order to decouple the high energy laser beam from an image received on the same optical path. The second mirror 12 is a tip/tilt mirror, the angle of which is variable and commanded by a control device.

The high energy laser beam L reflected on the second tilted mirror then passes through a focusing device 14 embodied, for instance, as a telescope, and strikes the outer skin of the very remotely situated and/or moving target object Z, which in the illustrated example is formed by an aircraft. In this manner the high energy laser beam L produces a radiation spot S on the outer skin of the target object Z. Using the effect of the high energy laser beam L, the outer skin of the target object Z is heated at this radiation spot S such that the structure at this location is weakened and the target object Z is destroyed or damaged thereby. One typical use is the engagement of aircraft weapons.

On its path from the device V to the target object Z, the high energy laser beam L passes through the atmosphere A, in which turbulences T occur; the latter are represented schematically in FIG. 1 as a wavy line. The effect of such turbulences is that the radiation spot S on the target object Z is not location-fast, but instead deviates slightly with respect to the hold point H, sighted by a target device, on the target object Z. The result is that the radiation energy applied locally to the outer skin of the target object Z does not remain constant during the irradiation, so that the effect of the irradiation is sub-optimal. The temperature required on the outer skin of the target object Z to soften or melt the outer skin is therefore only attained after a longer irradiation period and/or only when using greater radiation energy. To attain this goal even with lower radiation energy and a shorter irradiation period, the radiation spot S on the outer skin of the target object Z must be stabilized locally. In addition to the conventional methods for target tracking that follow the radiation spot S extremely precisely, even for a moving target object Z, the problem of target point displacement of the high energy laser beam L due to turbulences must be solved.

To this end, the target object Z is illuminated from essentially just as great a distance as the distance between the device V and the target object Z by means of an illumination device 2 that is formed, for instance, by an illumination laser 20. The illumination beam B emitted by the illumination laser 20 normally has a wavelength that deviates from the high energy laser beam L. The illumination laser 20 is divergent and illuminates the entire target object or at least extensive areas of the target object Z.

The illumination beam B also travels a great distance from the illumination device 2 to the target Z and strikes the target object Z, specifically also on the outer skin at least in the area of the radiation spot S. From there the illumination beam B' reflected on the outer skin of the target object Z is guided on the same optical path P to the device V that the high energy laser beam L takes from the device V to the target Z. This means that the reflected illumination beam B' also passes through the atmosphere A and its turbulences T and therefore experiences the same optical deviations as the high energy laser beam L passing through the turbulences T at the same point in time.

The reflected illumination beam B' coming from the target object Z passes through the focusing device 14 and strikes the second tilted mirror 12, which deflects it towards the first tilted mirror 10.

This first tilted mirror 10 is permeable for the wavelength of the illumination beam B so that it forms a radiation decoupling device that does not deflect the illumination beam B' reflected by the target object Z, but instead lets it pass through. The reflected illumination beam B' passing through the first tilted mirror 10 then strikes an image acquisition device 3 that is formed, for instance, by a high speed camera 30. The image acquisition device 3 acquires an image of an area of the target object Z or even the entire target object Z.

The image signal obtained in the image acquisition device 3 is guided via a signal line 32 to an image processing device 34 that analyzes the image represented by the image signal and compares it to an image produced previously. This previously produced image may be an image acquired at a prior or earlier point in time or it may be a synthetically produced image. From a series of such comparisons of images produced successively or images acquired by the image acquisition device 3 of the area illuminated by the illumination beam B on the outer skin of the target object Z, which area is perceived via the reflected radiation illumination radiation B', the image processing device 34 can provide a prediction about which optical influences the high energy laser beam L being radiated at this point in time is subjected to on its path through the atmosphere A. The image processing device determines from this prediction a correction signal that is sent by a control device 36, which is provided in the image processing device 34 or is connected thereto—symbolized by the open arrow K—as a control signal to a control device for the second tilted mirror 12 embodied as a tip/tilt mirror.

Naturally, with minor concessions to accuracy, it is also possible to determine the correction signal directly from a comparison of the image signals of the most recently received images of the illumination point without a prediction being provided and then being used as the foundation for the correction.

The second tilted mirror 12 thus forms an optical correction device and compensates the optical effects that are expected on the path between the device V and the target object Z that are caused essentially by the turbulences T. In this manner a fine tracking circuit is formed that compensates the damaging effects of the turbulences T on the high energy laser beam L (and naturally also on the reflected illumination beam B') so that the radiation spot S formed by the laser beam L on the outer skin of the target object Z remains nearly locationally constant.

In the device depicted in FIG. 1, light returned from the target is received and evaluated in a high speed camera in the same optical canal or on the same optical path that the high energy laser passes through. On the basis of this a correction of the high energy laser beam is made using, for instance, a tip/tilt mirror embodied as a piezo mirror as the optical correction device. Although the target object in the illustrated example is illuminated by means of an illumination laser, other forms of illumination may also be used, including for evaluating the back reflection due to solar irradiation.

The core point of the described inventive method, illustrated as an example, is the comparison of a so-called template image of an object (the target object or part of the target object) with the image currently being acquired by the image acquisition device 2 (called the fine tracking image in the following). The goal is to determine the parameters of a transformation that reproduces the template image optimally, in the context of a certain quality, on the current fine tracking image. The minimum quadratic error amount of the pixel deviations may be used for this, for instance. At this point it is also possible to weight the influence of certain parameters of the transformation in the error amount differently or to give more or less weight to certain pixel deviations. In addition, a hierarchical optimization in which the components of a transformation (e.g. rotation, translation) are successively optimized is also possible. The transformation itself is called "warping" and the parameters of the transformation are known as warping parameters.

The transformation can permit various degrees of freedom. As a rule, rotation, translation, extension or compression, and shearing of the template image are permitted. In this case, six warping parameters must be determined. However, projective or other transformations are also possible. In this case the number of warping parameters may vary. For the application, however, the path of reducing the warping parameters proved useful. Depending on the encounter geometry and target trajectory, certain effects such as shearing or compression do not occur, so that the use of fewer warping parameters (for instance three or five) may be useful.

If the hold point (the sighted point on the target object Z that the high energy laser beam L is supposed to strike) is defined in the template image, the hold point may be transformed into the current image using the determined transformation instructions and the displacement that the control device 36 uses to calculate the correction signal may be determined directly.

The warping parameters are also preferably used for calculating correction signals for actuating a deformable mirror for compensating higher modes (corresponding to a deformation of the radiation spot formed by the high energy laser).

The template image itself may be a generic image of the target object Z that is produced in advance and stored in a memory of the image processing device 34. Alternatively, the template image may be an image generated using an image sequence initially recorded by the image acquisition device 3 (prior to initiating the engagement by activating the high energy laser). Finally, the template image may alternatively also be formed using a selection, made by an operator, of an excerpt from the fine tracking image. Which of these alternative methods is employed depends, for instance, on the type of target object. For rapidly moving target objects, the selection must be made automatically; for slow target objects it is reasonable for the operator to decide. The same applies to the selection of the hold point, which may be provided automatically or by the operator.

During the course of the engagement, the view of the object may change profoundly, for instance due to a flight maneuver of the target object, so that the underlying template image is no longer appropriate to the situation. To counter this effect, the template image may be modified using information from the fine tracking image—the template is then designed to be adaptive. The portion of information from the fine tracking image that is used to modify the template may be limited ("learning rate").

Since, in general, the template image contains fewer pixels than the image acquired by the image acquisition device, and since the calculation complexity and thus also the required computing time increases with the number of pixels, the template is preferably "warped," that is, subjected to a transformation. Since the warping must occur during the course of optimization in every iteration step, this significantly reduces the calculation complexity. In principle, however, the reverse is also possible. In addition, complexity can be spared in that the pixel resolution of the template image is reduced.

Under the aspect of correcting the influence of turbulence, a spatially limited area (characterized by the Fried radius $r_0$) around the hold point on the target object is critical. If the target object is large compared to this area, it may be reasonable to use a so-called sub-template that contains only this area of the target object. In this case, the template image is used for determining a rough orientation (primarily for correcting the movement of the target). Then another detailed orientation is determined using the sub-template (primarily for correcting the movement due to turbulences). Like the selection of the template, the selection of the sub-template may also be made in different ways. Automatic selection of an area around the pre-specified hold point, the size of which is selected as a function of $r_0$, seems particularly reasonable.

The described device produces photographic images of the target object that, using the warping method, are the basis for determining a hold point. Simultaneously, a high energy laser spot is radiated onto the target in the same optical canal or on the same optical path through which the light for the photographic images is received. The displacements from the hold point (determined from the warping method) and from the center of gravity of the high energy laser spot may be seen in FIG. 2. In this figure, the lighter line (BV) depicts the displacement of the hold point H of the warping method from the image center and the darker line (HEL) depicts the displacement of the center of gravity of the high energy laser beam from the image center.

Figure 2:
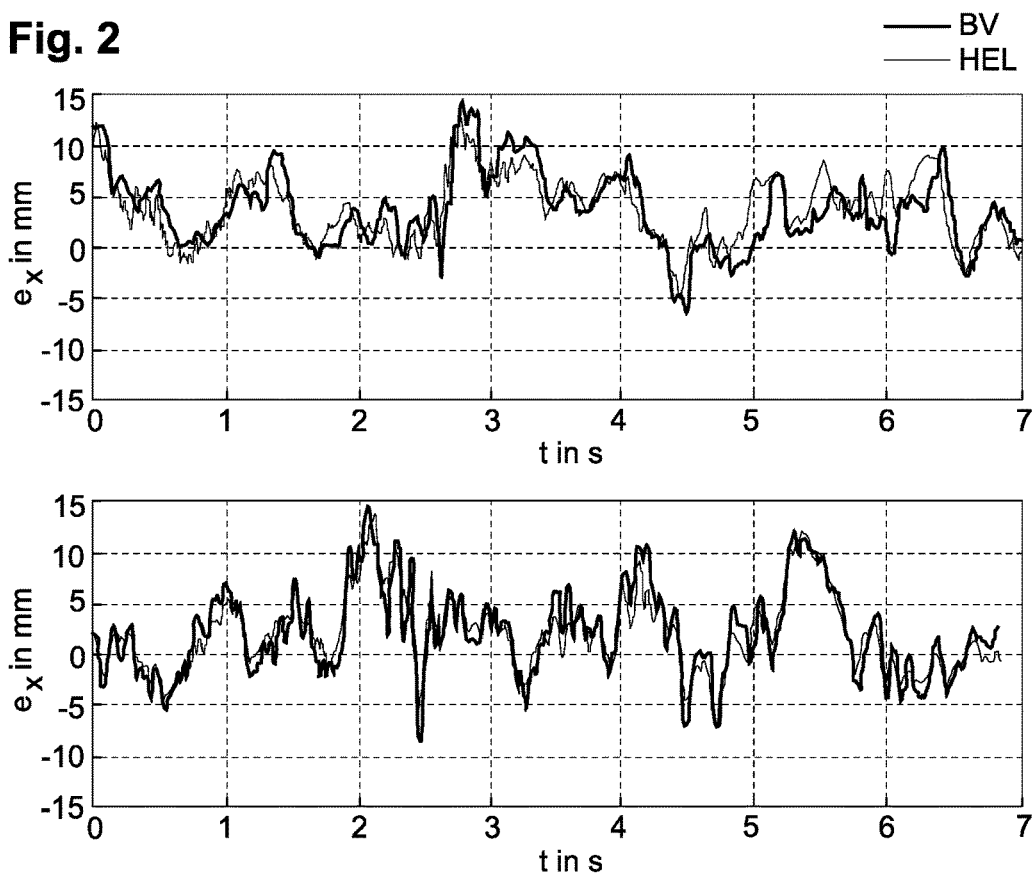
FIG. 2 is a measurement record of the displacement actual displacement of the radiation spot formed by the high energy laser on the target object and the displacement calculated by means of the image processing method; and, FIG. 3 depicts the correlations of displacements from FIG. 2.
Figure 3:
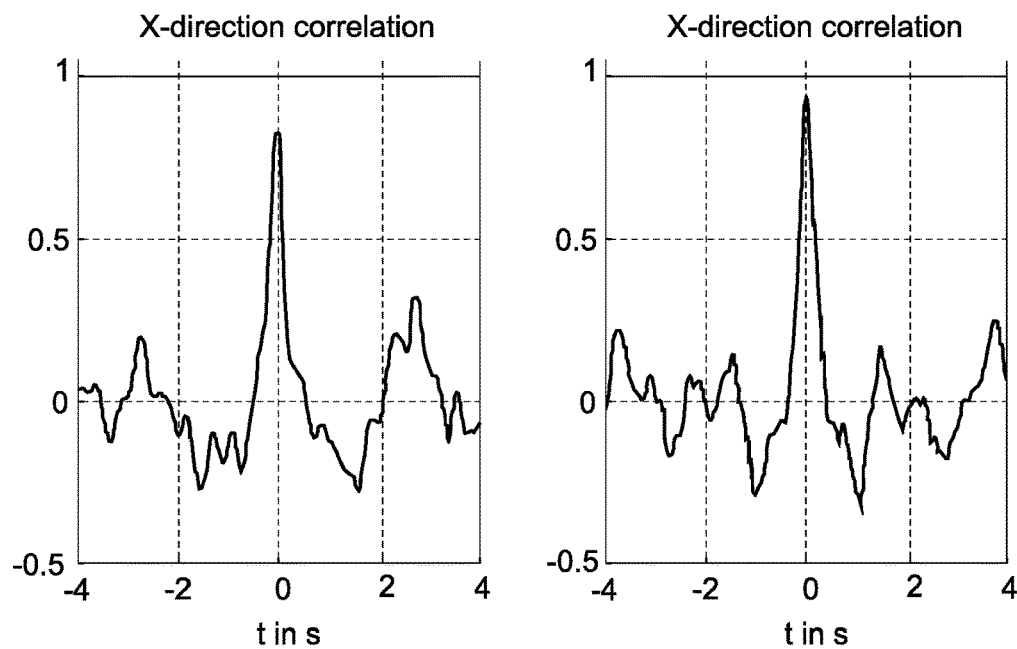

FIG. 3 illustrates the correlation of the displacements, that is, of the two curves, from FIG. 2 in the x direction and in the y direction, and thus confirms the functionality of the inventive approach to estimating turbulence and thus the confirms the turbulence error compensation performed thereafter.

Reference numbers in the claims, description, and drawings are merely intended to facilitate better understanding of the invention and shall not limit the protective scope.

REFERENCE LIST

1 High energy laser
2 Illumination device

3 Image acquisition device
10 First tilted mirror (radiation decoupling device)
11 Control device
12 Second tilted mirror (optical correction device)
14 Focusing device
20 Illumination laser
30 High speed camera
32 Signal line
34 Image processing device
36 Controller device
A Atmosphere
B Illumination beam
B' Reflected illumination beam
H Hold point
K Correction signal
L High energy laser beam
P Optical path
S Radiation spot
T Turbulences
V Device
Z Target object

What is claimed is:

1. A method for local stabilization of a radiation spot on a remote target object, wherein the radiation spot is formed by a high energy laser beam that is aimed at the target object by a high energy radiation emitter, wherein the high energy laser beam is capable of heating an outer skin of the remote target, the method comprising:
illuminating the target object is illuminated by an illumination beam that is aimed at the target object by an illumination device, wherein the illumination device emits a laser beam;
receiving, by an image acquisition device, radiation reflected by the target object that is illuminated by the illumination beam, wherein the radiation reflected by the target object to the image acquisition device passes through the same optical path as the high energy laser beam;
performing an image processing by analyzing and comparing an image of the illuminated target object or part of the illuminated target object acquired by the image acquisition device to at least one image of the illuminated target object or part of the illuminated target object produced at a prior point in time or to an image stored in an object database;
determining a correction signal, based on said comparing, with which an optical correction device arranged in the optical path passed through by both the high energy laser beam and the reflected radiation is actuated,
wherein the optical correction device comprises a tip/tilt mirror.

2. The method in accordance with claim 1, wherein the illumination beam has a wavelength that differs from the high energy laser beam.

3. The method in accordance with claim 2, further comprising predicting a future image interference based on a comparison of images of the illuminated target object or part of the illuminated target object that correspond to different points in time,
wherein determining the correction signal comprises determining the correction signal based, at least in part, on said predicted image interference.

4. The method in accordance with claim 2, the illumination beam emitted by the illumination device is a laser beam.

5. The method in accordance with claim 1, further comprising predicting a future image interference based on a comparison of images of the illuminated target object or part of the illuminated target object that correspond to different points in time,
wherein determining the correction signal comprises determining the correction signal based, at least in part, on said predicted image interference.

6. The method in accordance with claim 5, wherein predicting the future image interference comprises predicting the future image interference based on an analysis of only a part of the acquired image.

7. The method in accordance with claim 5, the illumination beam emitted by the illumination device is a laser beam.

8. The method in accordance with claim 1, wherein the analysis of the acquired image is carried out by at least one image warping method, for which purpose a template image is used.

9. The method in accordance with claim 8, further comprising minimizing the quadratic pixel deviation between the acquired image and the warped template image.

10. The method in accordance with claim 9, wherein predicting the future image interference comprises predicting the future image interference based on an analysis of only a part of the acquired image.

11. The method in accordance with claim 8, wherein predicting the future image interference comprises predicting the future image interference based on an analysis of only a part of the acquired image.

12. The method in accordance with claim 1, the illumination beam emitted by the illumination device is a laser beam.

13. A device configured to locally stabilize a radiation spot on a distant target object according to the method of claim 1, wherein the device comprises:
an illumination device for emitting the illumination beam onto the target object, wherein the illumination device is capable of emitting a laser beam;
a high energy laser for emitting the high energy laser beam onto the target object, wherein the high energy laser beam forms a spot on the target and the high energy laser beam is capable of heating an outer skin of the target;
an optical correction device that is arranged in the optical path of the high energy laser beam and is configured to be actuated by a control device;
a radiation decoupling device that is arranged in the optical path of the high energy laser beam and is configured to decouple radiation from this optical path that is received as a reflection of the illumination beam and to guide said radiation onto the image acquisition device; and,
an image processing device, connected to the image acquisition device and comprising the control device, configured to transmit an image signal therefrom, wherein the control device is configured to produce the correction signal and to transmit the correction signal to the optical correction device,
wherein the optical correction device comprises a tip/tilt mirror.

14. The device in accordance with claim 13, wherein the image acquisition device comprises a high speed camera.

15. The device in accordance with claim 14, wherein the optical correction device comprises a tip/tilt mirror.

* * * * *